(12) United States Patent
Hanisch et al.

(10) Patent No.: US 9,394,114 B2
(45) Date of Patent: Jul. 19, 2016

(54) TRANSPORT DEVICE WITH CONTROLLABLE CONVEYING ELEMENT

(71) Applicant: Robert Bosch GmbH, Stuttgart (DE)

(72) Inventors: Markus Hanisch, Fellbach (DE); Heinrich van de Loecht, Muggensturm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/437,572

(22) PCT Filed: Sep. 23, 2013

(86) PCT No.: PCT/EP2013/069701
§ 371 (c)(1),
(2) Date: Apr. 22, 2015

(87) PCT Pub. No.: WO2014/067712
PCT Pub. Date: May 8, 2014

(65) Prior Publication Data
US 2015/0274433 A1     Oct. 1, 2015

(30) Foreign Application Priority Data
Nov. 2, 2012 (DE) .......................... 10 2012 220 008

(51) Int. Cl.
| | |
|---|---|
| *B60L 13/06* | (2006.01) |
| *B65G 17/46* | (2006.01) |
| *B65G 54/02* | (2006.01) |
| *B65G 43/02* | (2006.01) |

(52) U.S. Cl.
CPC ................ *B65G 43/02* (2013.01); *B65G 54/02* (2013.01); *B65G 2203/0283* (2013.01); *B65G 2203/042* (2013.01)

(58) Field of Classification Search
CPC .......... B01L 13/06; B65G 17/46; B65G 54/02
USPC ................ 198/619, 690.1, 805; 104/284, 292
See application file for complete search history.

(56) References Cited

U.S. PATENT DOCUMENTS

| | | | | |
|---|---|---|---|---|
| 4,825,111 A | * | 4/1989 | Hommes | ............... B60L 15/005 104/290 |
| 5,180,048 A | * | 1/1993 | Kawada | ................. B65G 54/02 104/282 |

(Continued)

FOREIGN PATENT DOCUMENTS

| | | |
|---|---|---|
| DE | 4311863 | 8/1994 |
| DE | 102010027925 | 10/2011 |

OTHER PUBLICATIONS

International Search Report for Application No. PCT/EP2013/069701 dated Nov. 28, 2013 (English Translation, 2 pages).

*Primary Examiner* — Douglas Hess
(74) *Attorney, Agent, or Firm* — Michael Best & Friedrich LLP

(57) ABSTRACT

The present invention is a transport device for conveying a product, comprising a movable conveying element for conveying the product, a stationary running rail that defines a running path for the conveying element, a first linear motor drive device, a second linear motor drive device, a control device that actuates the two linear motor drive devices, and a sensor device that detects an orientation of the conveying element relative to the running rail and transmits it to the control device.

20 Claims, 3 Drawing Sheets

(56) References Cited

U.S. PATENT DOCUMENTS

| | | | | |
|---|---|---|---|---|
| 6,107,703 A * | 8/2000 | Korenaga | ............ | G03F 7/70691 310/12.06 |
| 6,568,332 B1 * | 5/2003 | Holzinger | ............... | E01B 25/32 104/255 |
| 6,876,107 B2 * | 4/2005 | Jacobs | .................... | B60L 15/38 310/12.19 |
| 7,026,732 B1 * | 4/2006 | Backman | ............... | H02K 41/03 104/292 |
| 8,485,350 B2 * | 7/2013 | Reinisch | ................ | B65G 54/02 104/281 |
| 8,511,235 B2 * | 8/2013 | Fukukawa | .............. | B60L 13/03 104/292 |
| 8,733,541 B2 * | 5/2014 | van de Loecht | ....... | B65G 54/02 198/805 |
| 8,960,099 B2 * | 2/2015 | Hosek | ............... | H01L 21/67161 104/282 |
| 9,045,183 B2 * | 6/2015 | Laurence | ............ | B62D 65/024 |
| 9,174,621 B2 * | 11/2015 | Manes | .................... | B61H 7/00 |

\* cited by examiner

TRANSPORT DEVICE WITH CONTROLLABLE CONVEYING ELEMENT

BACKGROUND OF THE INVENTION

The present invention relates to a transport device with a controllable conveying element, in particular in order to counteract yawing about a vertical axis of the conveying element.

Transport systems for conveying products are used, for example, for conveying tasks of packaging machines and are known in various developments from the prior art. For example, DE 102010027925 A1 shows a transport system where a movable conveying element is moved by means of a linear motor driving device. The conveying element, in this connection, is realized in an articulated manner in order to be able to move through smaller curve radii. However, during operation situations can occur in which the conveying elements yaw about their vertical axis. A guide rail is certainly provided on the stationary running rail, however to design the transport system in a reliable manner a large guiding ratio is necessary, which leads to the transport system being constructed in a relatively large manner. Along with the guide rail, horizontal guide rollers also have to be provided in particular on the conveying element, which has a negative influence on a size of the conveying element. Consequently, it would be desirable to have a transport device which is able to safeguard carrying out transporting tasks in a process-safe manner in spite of having small dimensions.

SUMMARY OF THE INVENTION

The advantage of the transport device according to the invention, in contrast, is that reliable guiding is possible and nevertheless a very compact and space-saving design can be achieved. As a result, the transport device according to the invention can be lighter and in particular energy consumption can be optimized. This is achieved according to the invention as a result of a first and a second linear motor driving device being provided on the transport device. The two linear driving devices, in this case, can also be used, along with the actual forward movement, for securing the position of a conveying element which runs on a running rail. In this connection, one of the two linear driving devices can be used to generate the forward movement and the other of the two linear drive devices can be used to secure the position. In addition, a mechanical guide means is no longer necessary. The two linear motor driving devices, in this case, are arranged eccentrically on the conveying element. I.e. the two linear motor driving devices are arranged to the left and/or to the right of a center plane of the conveying element, the center plane being directed in the conveying direction. In addition, a position determining device, which determines a position and alignment of the conveying element and transmits this to a control device, is provided. Corresponding to the respective position and alignment of the conveying element, in particular in the case of rotations about a vertical axis of the conveying element, the control device controls one and/or both linear motor driving devices in order to move the conveying element back into the desired starting position.

The position determining device preferably includes an angle sensor which detects angular deviations of the conveying element with respect to a center axis of the running rail or to the direction of movement. In a particularly preferred manner, in this case, the angle sensor detects angular deviations between a transverse axis of the conveying element and the center axis of the running rail.

In a further preferred manner, the position determining device includes an acceleration sensor for detecting an acceleration of the conveying element and/or a change in the acceleration of the conveying element. Said acceleration values can also be used additionally for determining the position and alignment by way of which the conveying element deviates from the ideal position.

According to a further preferred development of the present invention, the position determining device additionally includes a speed sensor which detects a speed of the conveying element and/or a change in the speed of the conveying element. These values can also be used additionally for determining the position.

In a further preferred manner, the position determining device includes a gyrometer for detecting rotary movements of the conveying element about its vertical axis. The gyrometer can be used on its own or additionally in conjunction with other sensors in order to detect deviations of the conveying element from an ideal position.

In order to be able to carry out position determining in a particularly simple and cost-efficient manner, the position determining device includes a first and a second position point which are arranged on the conveying element. The two position points are spaced apart from one another at a fixed spacing in the direction of movement. The control device is set up to determine an alignment/position of the conveying element by way of the spacing. This is possible as when the conveying element rotates about its vertical axis, the spacing between the fixed position points changes, the change being a measurement for the rotary movement of the conveying element about its vertical axis.

In order to achieve a particularly secure and sturdy guiding of the conveying element on the running rail, an additional guide rail is provided in a further preferred manner on the running rail. In this connection, the conveying element comprises at least one, in a preferred manner two, horizontal rollers which are guided on the guide rail. In the case of two horizontal rollers, the guide rail is preferably provided between the two horizontal rollers in operation.

In a further preferred manner, the first and second linear motor driving device is constructed in such a manner that permanent magnets of the linear motor driving device are provided on the conveying elements, and coils are arranged in the running rail. As an alternative to this, it is also possible for coils to be provided in the conveying elements and permanent magnets to be arranged on the running rails. As a further alternative to this, the first linear motor driving device is preferably constructed in such a manner that the permanent magnets are provided on the conveying elements and the coils are provided on the running rail, and the second linear motor driving device is constructed in such a manner that the coils are arranged on the conveying elements and the permanent magnets on the running rail.

The transport device according to the invention is preferably used in conjunction with packaging machines or the filling of articles to be packaged.

BRIEF DESCRIPTION OF THE DRAWINGS

Preferred exemplary embodiments of the invention are described in detail below with reference to the accompanying drawing, identical or functionally identical parts being designated with the identical references in the different exemplary embodiments. The drawing is as follows.

DETAILED DESCRIPTION

A transport device 1 according to a first exemplary embodiment of the invention is described in detail below with reference to FIGS. 1 and 2.

Figure 1:
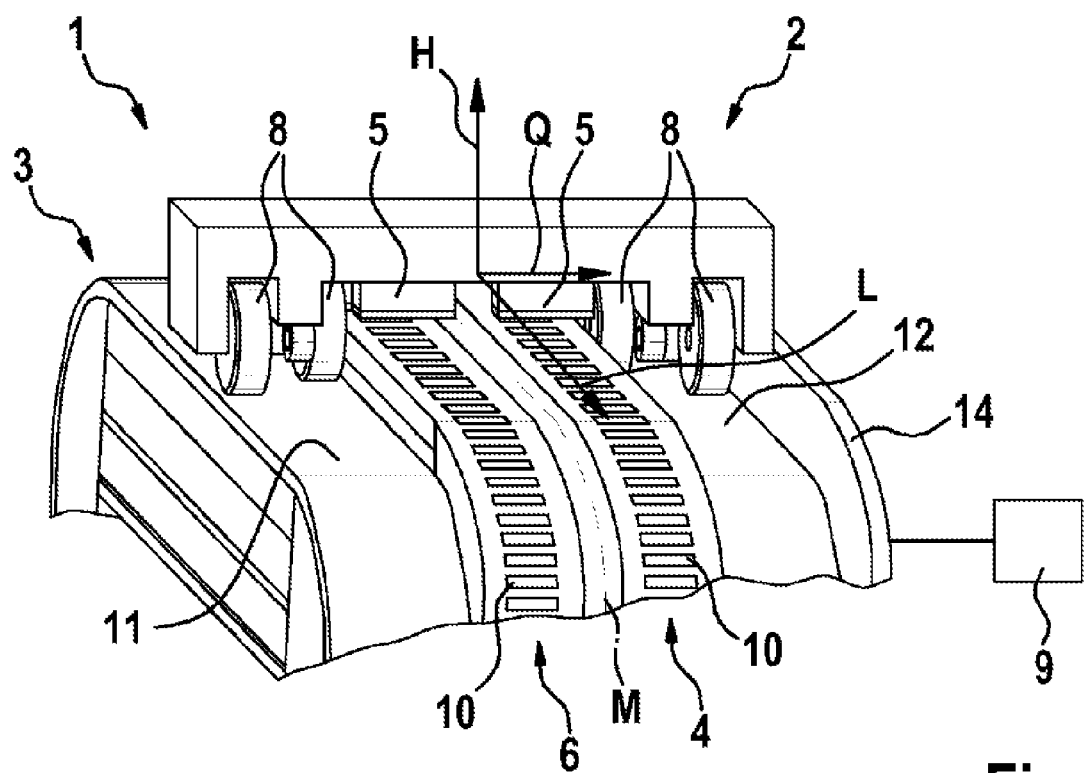
FIG. 1 shows a schematic, perspective view of a transport device according to a first exemplary embodiment of the invention.

As can be seen from FIG. 1, the transport device 1 includes a running rail 3, which is preferably provided circulating, and at least one conveying element 2 which is moved along the running path which is defined by the running rail 3. The transport device 1 includes a first linear motor driving device 4 and a second linear motor driving device 6. Coils 10 of the two linear driving devices 4, 6 are arranged parallel to one another on the running rail 3. In this connection, in each case one row of coils is arranged on the running rail 3 eccentrically from a center plane M. The first linear motor driving device 4 is arranged to the left of the center plane M in the direction of movement X of the conveying element 2 and the second linear motor driving device 6 is arranged to the right of the center plane M.

Two rows of permanent magnets 5, which are also arranged eccentrically of the conveying element 2, are provided on the conveying element 2. As can be seen in particular from FIG. 2, in this connection, two permanent magnets 5 are provided in each case on the conveying element 2 per linear motor driving device.

In addition, the conveying element 2 includes four vertical rollers 8, one pair of vertical rollers running along a first running track 11 and one pair of vertical rollers running along a second running track 12, both of which are provided on the running rail 3. The vertical rollers 8, in this case, are arranged somewhat offset with respect to one another in the direction of movement X in order to ensure a sturdy position of the conveying element 2.

Figure 2:
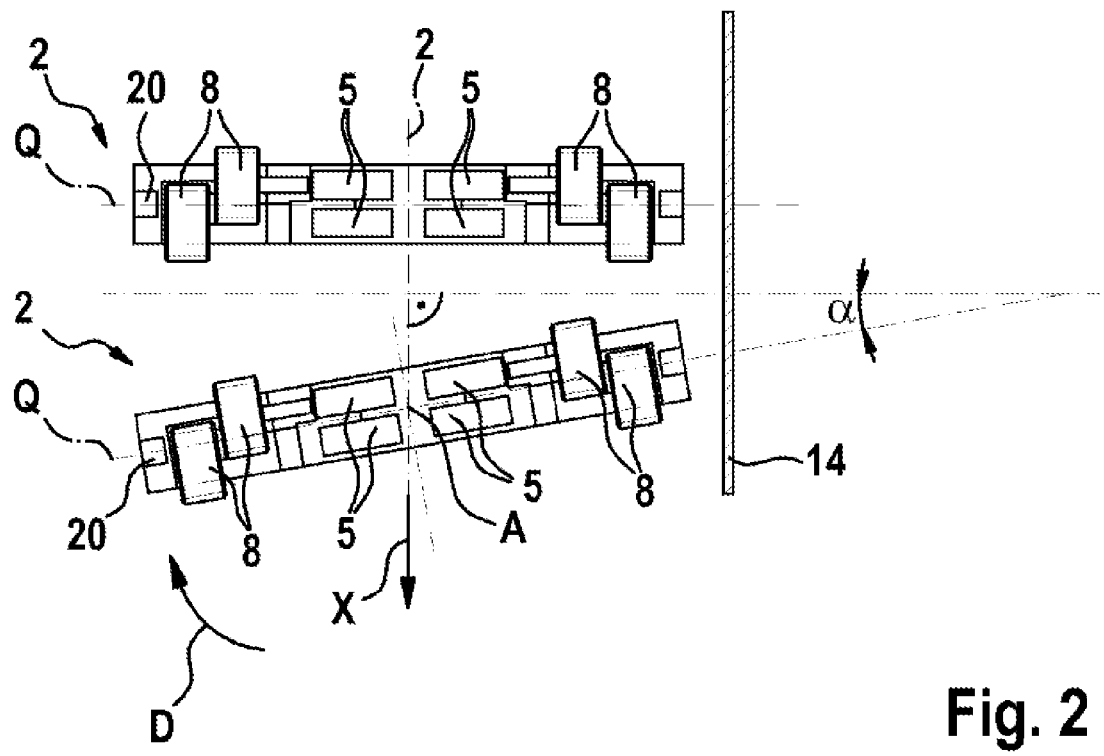
FIG. 2 shows a schematic view of conveying elements of the first exemplary embodiment in the normal state and in the rotated state, both shown from below.
Figure 3:
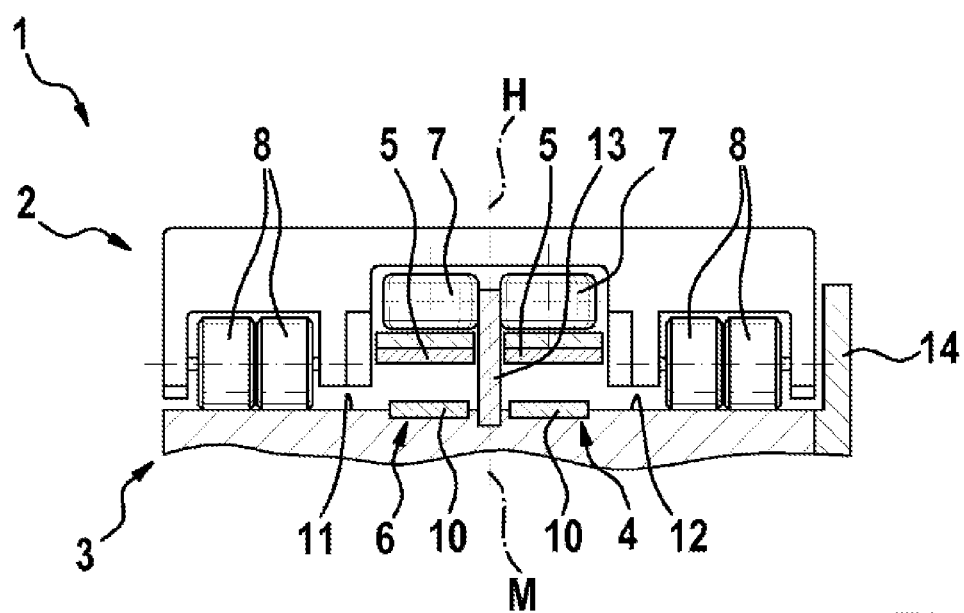
FIG. 3 shows a schematic view of a transport device according to a second exemplary embodiment of the invention and FIGS. 4 to 6 show different positions of a conveying element relative to a running rail for illustrating the principle according to the invention.

As can be seen in particular from FIG. 2, the direction of movement X corresponds to a longitudinal axis L of the conveying element 2. Situations in which the conveying element 2 rotates about its vertical axis H can arise in operation. Such a state is shown in FIG. 2 in the case of the conveying element which is characterized by way of the reference 2'. In this connection, the conveying element 2' has rotated about the vertical axis H by an angle α.

In said exemplary embodiment, the conveying element 2 includes an angle sensor 20 which is able to detect deviations of a transverse axis Q of the conveying element relative to the direction of movement X. The angular deviation of the conveying element 2 is supplied to a control device 9 which actuates the two linear motor driving devices 4, 6 in a corresponding manner such that a torque working in the opposite direction acts on the conveying element 2' in order to move the same back into the starting position, which is shown in the top part in FIG. 2. A torque corresponding to the arrow D is applied to the conveying element 2' in said exemplary embodiment.

The transport device 1 additionally includes a position determining device 14 which runs parallel to the running rail 3 at the side of the running rail 3. The position determining device 14 is connected to a control device 9 which, in particular, actuates the linear motor driving devices 4, 6 in order to make it possible for the conveying element 2 to move along the running rail 3. In addition, the control device 9 is set up in such a manner that the conveying element 2 is held in the correct alignment (the position of the conveying element 2 shown in the top part in FIG. 2) in which a transverse axis Q of the conveying element 2 extends perpendicularly to the direction of movement X.

According to the invention, in particular rotations of the conveying element 2 about its vertical axis H can consequently be compensated as a result of providing two linear motor driving devices 4, 6 which are arranged eccentrically on the transport device 1. In this case, only one of the two linear motor driving devices 4, 6 is preferably used for the propulsion and the other of the two linear motor driving devices 4, 6 is used for compensating the position.

Figure 4:
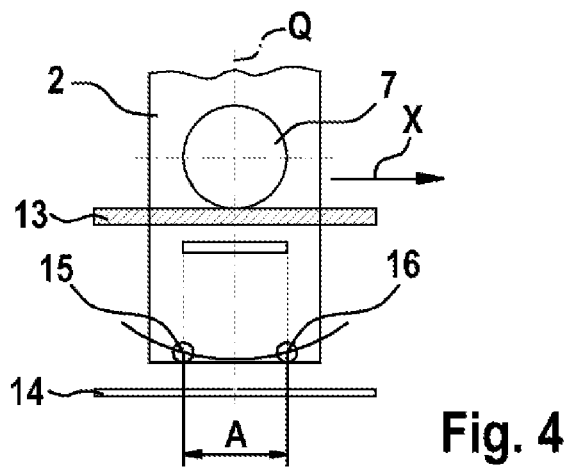
Figure 5:
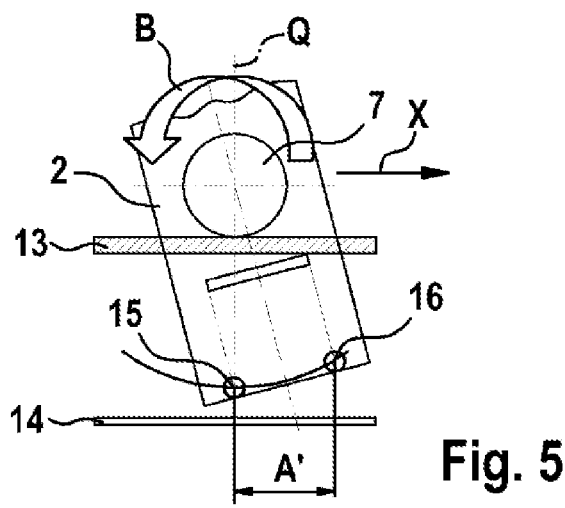
Figure 6:
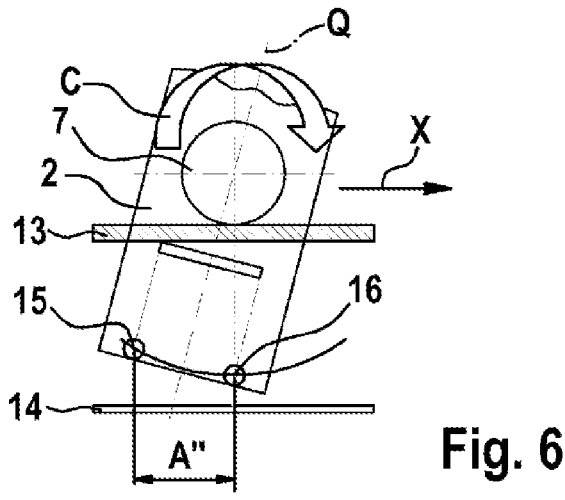

FIGS. 3 to 6 show a transport device 1 according to a second exemplary embodiment of the invention. As can be seen in particular from FIG. 3, the running rail 3 includes an additional guide rail 13 which protrudes in a perpendicular manner from the running surfaces of the running rail 3. The guide rail 13, in this case, is arranged in the center plane M between the two linear motor driving devices 4, 6. Two horizontal rollers 7, which are guided at the side by the guide rail 13, are additionally arranged on the conveying element 2. In this connection, in spite of the guiding on both sides, rotations of the conveying element 2 about its vertical axis H can nevertheless occur. This is illustrated schematically in FIGS. 4 to 6. FIG. 4, in this case, shows the ideal state of the conveying element relative to the running rail 3, a transverse axis Q of the conveying element 2 being perpendicular to the direction of movement X. In FIG. 5, the conveying element 2 has rotated relative to the running rail 3 in the direction of the arrow B. In FIG. 6, the conveying element 2 has rotated in the direction of the arrow C relative to the running rail 3.

In said second exemplary embodiment, a first position point 15 and a second position point 16 on the conveying element 2 are arranged at the side of the conveying element. There is a fixed spacing A between the two position points 15, 16 (compare FIG. 4). The fixed spacing A can be detected by the position determining device 14 at the side. If, as shown in FIG. 5, the conveying element 2 is rotated about its vertical axis H in the direction of the arrow B, the spacing between the two position points 15, 16 changes to a spacing A'. As the spacing between the two position points 15, 16 is always determined in the direction of movement X, the spacing A' is smaller than the original spacing A. Consequently, a control device 9 is able to deduce from this that a rotation of the conveying element 2 has taken place and it can perform corresponding counter measures as a result of actuating one or both linear motor driving devices 4, 6. In FIG. 6, the position determining device 14, on account of the rotation of the conveying element 2 in the direction of the arrow C, detects a spacing A" such that, in a corresponding manner, the control device 9 is able to counteract the torque acting on the conveying element 12.

Consequently, it should be noted in connection with the described exemplary embodiments that according to the invention it is possible, by means of two linear motor driving devices 4, 6, on the one hand to ensure propulsion of the conveying element 2 and on the other hand to apply a torque to the conveying element 2 in order to counteract yawing (rotation of the conveying element 2 about its vertical axis H). In this connection, by means of a very sensitive position determining device 14, even very small changes, i.e. rotations of the conveying element 2 relative to the running rail 3 are able to be detected and counter measures can be immediately performed in a corresponding manner as a result of actuating one or both linear motor driving devices 4, 6. Secure and rapid moving of the conveying element 2 can be ensured as a result. Nevertheless, it is possible to design the transport device 1 in a very space-saving and compact manner. In addition, it should be noted that further additional sensors, for example for detecting a speed of the conveying element and/or a change in a speed and/or detecting an acceleration of the conveying element and/or a change in an acceleration, can be received in order to realize, in a corresponding manner, more accurate counter measures against unwanted movements or rotations of the conveying element 2.

The invention claimed is:

1. A transport device for conveying a product, said transport device including
    a movable conveying element (2) for conveying the product,
    a stationary running rail (3) which defines a running path for the conveying element (2),
    a first linear motor driving device (4),
    a second linear motor driving device (6),
    a control device (9) which actuates the first and second linear motor driving devices (4, 6) and
    a sensor device which detects an alignment of the conveying element (2) relative to the running rail (3) and transmits the alignment to the control device (9),
    wherein the first and second linear motor driving devices (4, 6) are arranged eccentrically on the conveying element (2) and the running rail (3),
    wherein the first and second linear motor driving devices (4, 6) are configured to drive the conveying element (2) and to exert a torque on the conveying element (2) and
    wherein the control device is configured to carry out an alignment of the conveying element (2) as a result of applying a torque about a vertical axis (H) of the conveying element (2).

2. The transport device as claimed in claim 1, characterized in that the sensor device includes an angle sensor (20) which detects angular deviations of the conveying element (2) with respect to a direction of movement (X).

3. The transport device as claimed in claim 1, wherein the sensor device includes an acceleration sensor for detecting at least one of an acceleration of the conveying element (2) and a change in the acceleration of the conveying element (2).

4. The transport device as claimed in claim 1, characterized in that the sensor device includes a speed sensor for detecting at least one of a speed of the conveying element (2) and a change in the speed of the conveying element (2).

5. The transport device as claimed in claim 1, characterized in that the sensor device includes a gyrometer for detecting rotary movements of the conveying element (2).

6. The transport device as claimed in claim 1, characterized in that the sensor device includes a position determining device (14) and a first position point (15) and a second position point (16), wherein a fixed spacing (A) is arranged between the first and second position points (15, 16) on the conveying element (2) and wherein the control device (9) is configured to perform an alignment of the conveying element (2) by way of the spacing (A).

7. The transport device as claimed in claim 1, characterized in that the running rail (3) additionally includes a guide rail (13) and the conveying element (2) includes at least one horizontal roller (7), wherein the horizontal roller (7) is guided on the guide rail (13).

8. The transport device as claimed in claim 1, characterized in that the first and second linear motor driving devices (4, 6) each include permanent magnets (5) and coils (10), wherein the permanent magnets (5) are arranged on the conveying element (2) and the coils (10) are arranged on the running rail (3).

9. The transport device as claimed in claim 1, characterized in that the first and second linear motor driving devices (4, 6) each include permanent magnets (5) and coils (10), wherein the coils (10) are arranged on the conveying element (2) and the permanent magnets (5) are arranged on the running rail (3).

10. The transport device as claimed in claim 1, characterized in that the first and second linear motor driving devices (4, 6) each include permanent magnets (5) and coils (10), wherein permanent magnets (5) are arranged on the conveying element (2) and coils (10) are arranged on the running rail (3) for the first linear motor driving device (4) and coils (10) are arranged on the conveying element (2) and permanent magnets (5) are arranged on the running rail (3) for the second linear motor driving device (6).

11. A packaging device, including a transport device for conveying a product, said transport device including
    a movable conveying element (2) for conveying the product,
    a stationary running rail (3) which defines a running path for the conveying element (2),
    a first linear motor driving device (4),
    a second linear motor driving device (6),
    a control device (9) which actuates the first and second linear motor driving devices (4, 6) and
    a sensor device which detects an alignment of the conveying element (2) relative to the running rail (3) and transmits the alignment to the control device (9),
    wherein the first and second linear motor driving devices (4, 6) are arranged eccentrically on the conveying element (2) and the running rail (3),
    wherein the first and second linear motor driving devices (4, 6) are configured to drive the conveying element (2) and to exert a torque on the conveying element (2) and
    wherein the control device is configured to carry out an alignment of the conveying element (2) as a result of applying a torque about a vertical axis (H) of the conveying element (2).

12. The packaging device as claimed in claim 11, characterized in that the sensor device includes an angle sensor (20) which detects angular deviations of the conveying element (2) with respect to a direction of movement (X).

13. The packaging device as claimed in claim 11, wherein the sensor device includes an acceleration sensor for detecting at least one of an acceleration of the conveying element (2) and a change in the acceleration of the conveying element (2).

14. The packaging device as claimed in claim 11, characterized in that the sensor device includes a speed sensor for detecting at least one of a speed of the conveying element (2) and a change in the speed of the conveying element (2).

15. The packaging device as claimed in claim 11, characterized in that the sensor device includes a gyrometer for detecting rotary movements of the conveying element (2).

16. The packaging device as claimed in claim 11, characterized in that the sensor device includes a position determining device (14) and a first position point (15) and a second position point (16), wherein a fixed spacing (A) is arranged between the first and second position points (15, 16) on the conveying element (2) and wherein the control device (9) is configured to perform an alignment of the conveying element (2) by way of the spacing (A).

17. The packaging device as claimed in claim 11, characterized in that the running rail (3) additionally includes a guide rail (13) and the conveying element (2) includes at least one horizontal roller (7), wherein the horizontal roller (7) is guided on the guide rail (13).

18. The packaging device as claimed in claim 11, characterized in that the first and second linear motor driving devices (4, 6) each include permanent magnets (5) and coils (10), wherein the permanent magnets (5) are arranged on the conveying element (2) and the coils (10) are arranged on the running rail (3).

19. The packaging device as claimed in claim 11, characterized in that the first and second linear motor driving devices (4, 6) each include permanent magnets (5) and coils (10), wherein the coils (10) are arranged on the conveying element (2) and the permanent magnets (5) are arranged on the running rail (3).

20. The packaging device as claimed in claim 11, characterized in that the first and second linear motor driving devices (4, 6) each include permanent magnets (5) and coils (10), wherein permanent magnets (5) are arranged on the conveying element (2) and coils (10) are arranged on the running rail (3) for the first linear motor driving device (4) and coils (10) are arranged on the conveying element (2) and permanent magnets (5) are arranged on the running rail (3) for the second linear motor driving device (6).

* * * * *